(12) United States Patent
Vollenberg et al.

(10) Patent No.: US 6,887,573 B2
(45) Date of Patent: May 3, 2005

(54) POLYCARBONATE POLYESTER ARTICLES WITH ENHANCED ADHESION BETWEEN OUTER LAYER AND BASE SUBSTRATE

(75) Inventors: Peter H. Th. Vollenberg, Evansville, IN (US); Gabrie Hoogland, Breda (NL)

(73) Assignee: General Electric Company, Pittsfield, MA (US)

( * ) Notice: Subject to any disclaimer, the term of this patent is extended or adjusted under 35 U.S.C. 154(b) by 62 days.

(21) Appl. No.: 10/445,564

(22) Filed: May 27, 2003

(65) Prior Publication Data

US 2004/0028908 A1 Feb. 12, 2004

Related U.S. Application Data

(60) Provisional application No. 60/399,837, filed on Jul. 30, 2002.

(51) Int. Cl.$^7$ ................................................ B32B 27/36
(52) U.S. Cl. .................... 428/412; 264/176.1; 264/219; 428/64.7; 428/411.1; 428/412
(58) Field of Search .............................. 264/176.1, 219; 428/64.7, 411.1, 412

(56) References Cited

U.S. PATENT DOCUMENTS

| | | |
|---|---|---|
| 2,465,319 A | 3/1949 | Whinfield et al. |
| 2,675,390 A | 4/1954 | Rosenblatt |
| 2,888,484 A | 5/1959 | Dehm et al. |
| 2,999,835 A | 9/1961 | Goldberg |
| 3,038,365 A | 6/1962 | Peterson |
| 3,047,539 A | 7/1962 | Pengilly |
| 3,153,008 A | 10/1964 | Fox |
| 3,334,154 A | 8/1967 | Kim |
| 3,444,237 A | 5/1969 | Jaffe |
| 3,635,895 A | 1/1972 | Kramer |
| 4,001,184 A | 1/1977 | Scott |
| 4,123,436 A | 10/1978 | Holub et al. |
| 4,131,575 A | 12/1978 | Adelmann et al. |
| 4,754,064 A | 6/1988 | Lillwitz |
| 4,879,355 A | 11/1989 | Light et al. |
| 5,441,997 A | 8/1995 | Walsh et al. |
| 5,942,585 A | 8/1999 | Scott et al. |
| 6,136,441 A | 10/2000 | MacGregor et al. |
| 6,221,556 B1 * | 4/2001 | Gallucci et al. ........ 430/270.11 |

FOREIGN PATENT DOCUMENTS

GB          1 559 230          1/1977

OTHER PUBLICATIONS

Friefelder et al., Journal of Organic Chemistry, 31, 3438 (1966).

* cited by examiner

Primary Examiner—Terressa Boykin

(57) ABSTRACT

An clear coated article formed from a transparent/translucent molding composition comprising a uniform miscible resin blend of a polycarbonate resin and a cycloaliphatic polyester resin, said cycloaliphatic polyester resin comprising the reaction product of an aliphatic $C_2$–$C_{20}$ diol or chemical equivalent and a $C_6$–$C_{20}$ aliphatic diacid or chemical equivalent, said cycloaliphatic polyester resin contains at least about 80% by weight of a cycloaliphatic dicarboxylic acid, or chemical equivalent, and/or of a cycloaliphatic diol or chemical equivalent, wherein the cycloaliphatic polyester resin and the polycarbonate resin have a viscosity selected for enhancing the adhesion of the clear coat to the article.

20 Claims, No Drawings

POLYCARBONATE POLYESTER ARTICLES WITH ENHANCED ADHESION BETWEEN OUTER LAYER AND BASE SUBSTRATE

CROSS REFERENCE TO RELATED APPLICATIONS

This application claims priority to U.S. Provisional Application Ser. No. 60/399,837 filed on Jul. 30, 2002, which is incorporated herein by reference in its entirety.

FIELD OF THE INVENTION

This invention relates to articles formed of transparent/translucent blends of polycarbonate and polyester having a clear coat.

BACKGROUND OF THE INVENTION

Transparent blends of polycarbonate and polyesters have attractive properties like toughness and chemical resistance. Also, UV resistance is improved over that of polycarbonate by itself. U.S. Pat. No. 5,942,585 to Scott et al relates to clear blends of polycarbonates and polyesters where the polyester comprises a dicarboxylic acid component based on 1,4-cyclohexanedicarboxylic acid units and a glycol component comprising 2,2,4,4-tetramethyl-1,3-cyclobutanediol units. U.S. Pat. No. 6,136,441 to MacGregor et al relates to substrates with an adherent cycloaliphatic layer. References disclosing polycarbonate polyester blends and their transparent properties include U.S. Pat. No. 4,879,355 and GB Patent Application No. 1,559,230A.

Durable, glossy fascia associated with articles such as automobiles, luggage, appliances, and other durable articles made from plastics increase both the aesthetic appeal and the utility of these articles. Clear coatings on exterior of articles are useful for their scratch and abrasion resistance, as well as toughness and aesthetic appeal. A continued problem in the use of coatings is bonding the outer layer to the substrate layer.

Applicants have found that by controlling the viscosity of the constituents used in blends of polycarbonate and polyester of the present invention, one can surprisingly enhance/improve the adhesion between the outer layer and the base substrate of the articles manufactured therefrom, for finished articles with enhanced appearance, weatherability, scratch resistance and UV resistance.

SUMMARY OF THE INVENTION

An article has an outer layer applied onto its finished part. The article comprises a blend having a single $T_g$ of a mixture of poly(cyclohexane dimethanol cyclohexane dicarboxylate) (PCCD) and polycarbonate (PC), wherein the viscosity of the PCCD is selected for an enhanced adhesion between the outer layer and the finished base of the article.

In another embodiment, an article having an outer layer is clear coat. The article is formed from a transparent/translucent molding composition comprising a uniform miscible blend of a polycarbonate resin and a cycloaliphatic polyester resin, wherein cycloaliphatic polyester resin comprises the reaction product of an aliphatic $C_2$–$C_{20}$ diol or chemical equivalent and a $C_6$–$C_{20}$ aliphatic diacid or chemical equivalent, and wherein the cycloaliphatic polyester resin has a viscosity in a preferred low range or a preferred high range for enhancing the adhesion of the clear coat outer layer to the article.

In another embodiment, articles comprising blends of a polycarbonate resin and a cycloaliphatic polyester include a clear coat outer layer with excellent adhesion to the base substrate, wherein the polyester molecules are derived from cycloaliphatic diol and cycloaliphatic diacid compounds, specifically polycyclohexane dimethanol cyclohexyl dicarboxylate (PCCD).

In another embodiment, a clear coated article for use in exterior applications comprises a) a base substrate comprising a uniform miscible resin blend of a polycarbonate resin and a cycloaliphatic polyester resin containing at least about 80% by weight of units derived from a cycloaliphatic dicarboxylic acid, or chemical equivalent, and a cycloaliphatic diol or chemical equivalent; b) one or more layers of clear coat which constitute the outer layer on said base substrate. When the polyester content in the polyester polycarbonate blend, by weight percent, is 70% or greater, the cycloaliphatic polyester resin preferably has a viscosity of about 1500 to about 2500 poise for reducing the delamination of the clear coat. When the polyester content in the polyester polycarbonate blend is about 20 to about 40 percent by weight, preferably about 30%, the polycarbonate resin preferably has an MFR of 7 or greater for reducing the delamination of the clear coat.

DETAILED DESCRIPTION OF THE INVENTION

The article of the present invention comprises a preformed substrate based, coated with an outer layer. The Substrate base comprises a polyester polycarbonate blend. Applicants have surprisingly found that when certain polyesters are used for the blend, the outer layer surprisingly adheres extremely well to under underlying substrate base comprising the polyester/polycarbonate blend.

Substrate Base Comprising Polyester—Polycarbonate Blend. In one embodiment, the blend comprises polyesters which have both cycloaliphatic diacid and cycloaliphatic diol components, specifically polycyclohexane dimethanol cyclohexyl dicarboxylate (PCCD); and the polycarbonate comprises units of BPA, SBI bis phenol, aryl substituted bisphenols, cycloaliphatic bisphenols and mixtures thereof.

Polycarbonate Component. Typical polycarbonates comprise the divalent residue of dihydric phenols, Ar', bonded through a carbonate linkage and are preferably represented by the general formula III:

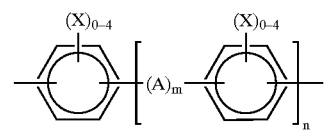

wherein A is a divalent hydrocarbon radical containing from 1 to about 15 carbon atoms or a substituted divalent hydrocarbon radical containing from 1 to about 15 carbon atoms; each X is independently selected from the group consisting of hydrogen, halogen, and a monovalent hydrocarbon radical such as an alkyl group of from 1 to about 8 carbon atoms, an aryl group of from 6 to about 18 carbon atoms, an arylalkyl group of from 7 to about 14 carbon atoms, an alkoxy group of from 1 to about 8 carbon atoms; and m is 0 or 1 and n is an integer of from 0 to about 5. Ar' may be a single aromatic ring like hydroquinone or resorcinol, or a multiple aromatic ring like biphenol or bisphenol A.

The dihydric phenols employed are known, and the reactive groups are thought to be the phenolic hydroxyl groups. Typical of some of the dihydric phenols employed are bis-phenols such as bis(4-hydroxyphenyl)methane, 2,2-bis (4-hydroxyphenyl)propane (also known as bisphenol-A), 2,2-bis(4-hydroxy-3,5-dibromo-phenyl)propane; dihydric phenol ethers such as bis(4-hydroxyphenyl)ether, bis(3,5-dichloro-4-hydroxyphenyl)ether; p,p'-dihydroxydiphenyl and 3,3'-dichloro-4,4'-dihydroxydiphenyl; dihydroxyaryl sulfones such as bis(4-hydroxyphenyl)sulfone, bis(3,5-dimethyl-4-hydroxyphenyl)sulfone, dihydroxy benzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl)sulfide, bis(4-hydroxy-phenyl)sulfoxide and bis(3,5-dibromo-4-hydroxyphenyl)sulfoxide. A variety of additional dihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate are preferred.

The aromatic polycarbonates can be manufactured by any processes such as by reacting a dihydric phenol with a carbonate precursor, such as phosgene, a haloformate or carbonate ester in melt or solution. U.S. Pat. No. 4,123,436 describes reaction with phosgene and U.S. Pat. No. 3,153,008 describes a transesterification process.

In one embodiment, the polycarbonate is made of dihydric phenols that result in resins having low birefringence for example dihydric phenols having pendant aryl or cup shaped aryl groups like: Phenyl-di(4-hydroxyphenyl)ethane (acetophenone bisphenol); Diphenyl-di(4-hydroxyphenyl) methane(benzophenone bisphenol); 2,2-bis(3-phenyl-4-hydroxyphenyl)propane, 2,2-bis-(3,5-diphenyl-4-hydroxyphenyl)propane, bis-(2-phenyl-3-methyl-4-hydroxyphenyl)propane; 2,2'-bis(hydroxyphenyl)fluorene; 1,1-bis(5-phenyl-4-hydroxyphenyl)cyclohexane; 3,3'-diphenyl-4,4'-dihydroxy diphenyl ether; 2,2-bis(4-hydroxyphenyl)-4,4-diphenyl butane; 1,1-bis(4-hydroxyphenyl)-2-phenyl ethane; 2,2-bis(3-methyl-4-hydroxyphenyl)-1-phenyl propane; 6,6'-dihdyroxy-3,3,3',3-tetramethyl-1,1'-spiro(bis)indane; (hereinafter "SBI"), or dihydric phenols derived from spiro biindane of formula IV:

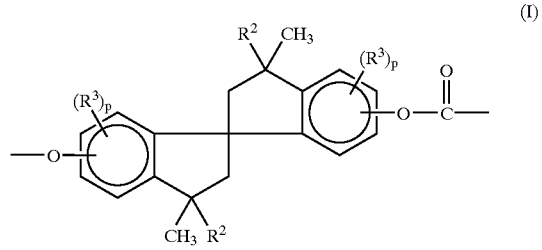

(I)

wherein units derived from SBI and its 5-methyl homologue are preferred, with SBI being most preferred.

Other dihydric phenols which are typically used in the preparation of the polycarbonates are disclosed in U.S. Pat. Nos. 2,999,835, 3,038,365, 3,334,154 and 4,131,575. Branched polycarbonates are also useful, such as those described in U.S. Pat. Nos. 3,635,895 and 4,001,184. Polycarbonate blends include blends of linear polycarbonate and branched polycarbonate.

It is also possible to employ two or more different dihydric phenols or a copolymer of a dihydric phenol with an aliphatic dicarboxylic acids like; dimer acids, dodecane dicarboxylic acid, adipic acid, azelaic acid in the event a carbonate copolymer or interpolymer rather than a homopolymer is desired for use in the preparation of the polycarbonate mixtures of the invention. Most preferred are aliphatic C5 to C12 diacid copolymers.

In one embodiment, the polycarbonates are high molecular weight aromatic carbonate polymers having an intrinsic viscosity (as measured in methylene chloride at 25° C.) ranging from about 0.30 to about 1.00 dl/gm. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

Cycloaliphatic Polyester Component. The cycloaliphatic polyester resin comprises a polyester having repeating units of the formula I:

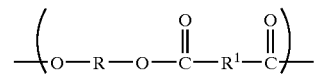

where at least one R or R1 is a cycloalkyl containing radical.

The polyester is a condensation product where R is the residue of an aryl, alkane or cycloalkane containing diol having 6 to 20 carbon atoms or chemical equivalent thereof, and R1 is the decarboxylated residue derived from an aryl, aliphatic or cycloalkane containing diacid of 6 to 20 carbon atoms or chemical equivalent thereof with the proviso that at least one R or R1 is cycloaliphatic. Preferred polyesters of the invention will have both R and R1 cycloaliphatic.

The present cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols. The cyclic components are necessary to impart good rigidity to the polyester and to allow the formation of transparent/translucent blends due to favorable interaction with the polycarbonate resin.

The polyester resins are typically obtained through the condensation or ester interchange polymerization of the diol or diol equivalent component with the diacid or diacid chemical equivalent component.

R and R1 are preferably cycloalkyl radicals independently selected from the following formula:

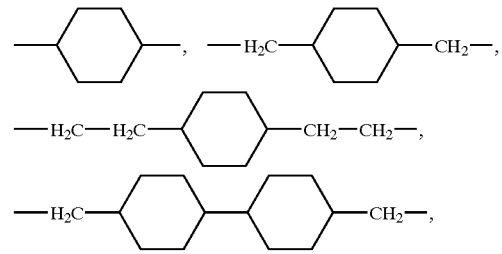

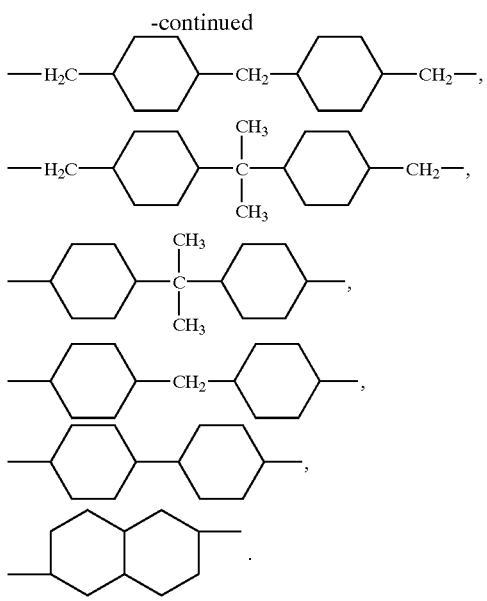

The preferred cycloaliphatic radical R1 is derived from the 1,4-cyclohexyl diacids and most preferably greater than 70 mole % thereof in the form of the trans isomer. The preferred cycloaliphatic radical R is derived from the 1,4-cyclohexyl primary diols such as 1,4-cyclohexyl dimethanol, most preferably more than 70 mole % thereof in the form of the trans isomer.

Other diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD), triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters and the like.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbomene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. See, Friefelder et al., Journal of Organic Chemistry, 31, 3438 (1966); U.S. Pat. Nos. 2,675,390 and 4,754,064. They may also be prepared by the use of an inert liquid medium in which a phthalic acid is at least partially soluble under reaction conditions and with a catalyst of palladium or ruthenium on carbon or silica. See, U.S. Pat. Nos. 2,888,484 and 3,444,237.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula II:

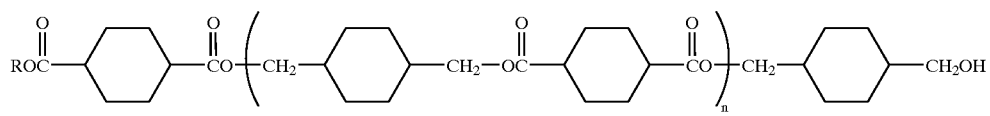

R is H or a lower alkyl. With reference to the previously set forth general formula, for PCCD, R is derived from 1,4 cyclohexane dimethanol; and R1 is a cyclohexane ring derived from cyclohexanedicarboxylate or a chemical equivalent thereof. The favored PCCD has a cis/trans formula.

The polyester polymerization reaction is generally run in the melt in the presence of a suitable catalyst such as a tetrakis (2-ethyl hexyl) titanate, in a suitable amount, typically about 50 to 200 ppm of titanium based upon the final product.

In one embodiment, the cycloaliphatic polyesters will have weight average molecular weights (determined by gel permeation chromatography using polystyrene standards) of about 30,000 to about 150,000 atomic mass units (amu), with about 60,000 to about 100,000 amu being preferred, and about 65,000 to about 95,000 amu being more preferred. In one embodiment, the cycloaliphatic polyesters will also have viscosities of about 500 to about 25,000 poise. In a second embodiment, viscosities of about 1,000 to about 20,000 poise. In a third embodiment, of about 1,500 to about 7,000 poise.

In one embodiment, the aliphatic polyesters used have a glass transition temperature (Tg) which is above 50° C., more preferably above 80° C. and most preferably above about 100° C.

Also contemplated herein are the above polyesters with from about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047, 539.

In one embodiment, the ratio of polycarbonate to cycloaliphatic polyester is from about 30:70 to 0:100 by weight. In a second embodiment, from about 60:40 to 80:20 by weight. In a third embodiment, from 65:35 to 75:25 by weight of the entire mixture.

In one embodiment, the ratio of polycarbonate to cycloaliphatic polyester is adjusted such that the base substrate of the article is transparent/translucent with a transmission of at least 75%, preferably the transmission rate of at least 80%. In another embodiment, the transparent/translucent base substrate has transmission rate of at least 90%.

In one embodiment of the invention, the cycloaliphatic polyester is a PCCD with a low viscosity of about 1500 to 2500 poise; preferably the PCCD has a viscosity of about 1800 to about 2200 poise. In another embodiment, the polycarbonate has an MFR of 7 or greater.

In one embodiment of the blends wherein the cycloaliphatic polyester is PCCD with a content higher than around 70%, a PCCD with a low viscosity of about 1500 to 2500 poise is preferable for excellent clear coat adhesion and other desirable exterior properties, including a transmission rate of at least 80%. When the cycloaliphatic polyester is a PCCD at a content of about 50 wt. %, the results are poor adhesion. In another embodiment wherein the cycloaliphatic polyester is PCCD with a content of about 30 wt. %, employing a polycarbonate resin with an MFR of 7 or greater surprisingly shows excellent clear coat adhesion property as well as desirable color properties.

Optional Stabilizer or Quencher Component. In one embodiment, a stabilizer or quencher material is used. Catalyst quenchers are agents which inhibit activity of any catalysts which may be present in the resins. Catalyst quenchers are described in detail in U.S. Pat. No. 5,441,997. It is desirable to select the correct quencher to avoid color formation and loss of clarity to the polyester polycarbonate blend.

In one embodiment, the stabilizers/quenchers are those which provide a transparent/translucent and colorless product. Typically, such stabilizers are used at a level of 0.001–10 weight percent and preferably at a level of from 0.005–2 weight percent. In one example, the stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like.

The phosphites may be of the formula V:

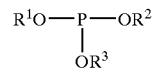

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula VI:

$$M_zH_yP_nO_{3n+1}$$

wherein M is a metal, x is a number ranging from 1 to 12 and y is a number ranging from 1 to 12, n is a number from 2 to 10, z is a number from 1 to 5 and the sum of (xz)+y is equal to n+2. The preferred M is an alkaline or alkaline earth metal.

In one embodiment, the quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

Optional Components. In one embodiment, additives such as antioxidants, thermal stabilizers, mold release agents, antistatic agents, whitening agents, colorants, plasticizers, minerals such as talc, clay, mica, barite, wollastonite and other stabilizers including but not limited to UV stabilizers, such as benzotriazole, supplemental reinforcing fillers such as flaked or milled glass, and the like, flame retardants, pigments, additional resins or combinations thereof may be added to the compositions of the present invention. The different additives that can be incorporated in the compositions are commonly used and known to one skilled in the art. Illustrative descriptions of such additives may be found in R. Gachter and H. Muller, Plastics Additives Handbook, 4th edition, 1993.

Examples of thermal stabilizers include triphenyl phosphite, tris-(2,6-dimethylphenyl)phosphite, tris-(2,4-di-t-butyl-phenyl)phosphite, tris-(mixed mono- and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agents include glycerol monostearate, sodium stearyl sulfonate, and sodium dodecylbenzenesulfonate. Examples of mold releasing agents include pentaerythritol tetrastearate, stearyl stearate, beeswax, montan wax, and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

II. Outer Coating Layer. In one embodiment, the outer layer is a clear coat layer. Clear coat layer is one that is transparent or substantially transparent to visible light, giving the article of the present invention a high gloss finish, protecting layer and/or a coating which is resistant to scratching, abrasions, marring, heat, UV radiation, and weathering.

In one embodiment, the clear coat is at least 90% transparent to visible light rays. In a second embodiment, the clear coat at least 95% transparent. In yet another embodiment, the clear coat layer may include color pigment materials for slightly coloring the same substrate (the color pigment may match or approximately match the color of the underlying substrate comprising the polyester polycarbonate blend).

Different types of materials may be used to make clear coat layer with having excellent adhesion to the substrate of the present invention. In one embodiment, the clear coat material comprises and an acrylic resin. In another embodiment, the clear coat may, for example, include or be made of a blend of a thermoplastic fluorinated polymer and an acrylic resin where the polymer component may be a thermoplastic fluorocarbon such as polyvinylidene fluoride and the acrylic resin may be polymethyl methacrylate or polyethyl methacryate resin, or mixtures thereof. In a third embodiment, a SURLYN® inclusive ionomer from E.I. duPont de Nemours located in Wilmington, Del., USA, may also be used for the clear coat layer. In a fourth embodiment, the substantially transparent clear coat is a polycarbonate based material available from Avery Dennison (Troy, Mich., USA) or Kurz-Hastings (Philadelphia, Pa., USA). In yet another embodiment, the clear coat layer is obtainable from Rexam Custom (located in North Carolina, USA) or Elf (located in Minnesota, USA). In another embodiment, the clear layer comprises a thermoplastic such as PC, PVC or TPU.

In one embodiment, the outer layer composition may comprise UV absorbers to protect the underlying material and the cross-linking agents for enhancing scratch resistant. In another embodiment, the outer layer composition may contain conventional additives in conventional amounts, for example, from 0.1 to 5 wt. %, such as, for example, levelling agents, degassing agents, antioxidants, light protecting agents, adhesion promoting agents, catalysts and rheology-controlling agents. In yet another embodiment, the clear coats may also contain colorless pigments, e.g., micronised titanium dioxide, aluminum oxide or silica.

In one embodiment, the outer layer may be from about 0.00015 to 0.080 inches thick. In another embodiment, about 0.00015 to 0.040 inches thick. In a third embodiment, from about 0.00015 to 0.020 inches thick.

The clear coat layer can be applied onto the substrate of the article of the present invention by various means, including but not limited to roll coating, reverse roll coating, painting, spraying, and laminating.

In one embodiment, the clear coat comprises a low melting lacquer powder from Robert Bosch Stewart Karl Worwag GmbH & Co., comprising high reactive acryl resins which contain epoxy groups, being sprayed onto the substrate layer via a powder gun. As the substrate comprising the polyester polycarbonate blend is heated, the surface temperature of the outer layer is heated such that the lacquer powder is melted and flows to form a clear coat closed layer.

Process of making compositions. The production of the compositions may utilize any of the blending operations known for the blending of thermoplastics, for example blending in a kneading machine such as a Banbury mixer or an extruder. The sequence of addition is not critical but all components should be thoroughly blended.

To prepare the resin composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device.

The glass transition temperature of the blend of the present invention is from about 60° C. to about 150° C. In one embodiment, it is from 120° C. to about 150° C.

Articles of the Invention. The articles of the invention are suitable for exterior applications such as those components forming exteriors of vehicles, e.g., wheel covers, door sides, bumper fascia, claddings, roof moldings, body panels, and the like. In one embodiment, the article is in the form of a transparent cover plate for automobile headlights, with a clear coat as a transparent outer layer of the cover plate.

In another embodiment, the articles are utilized as components of devices other than vehicles, such as components for snowmobiles, tractors, boats, green houses, and the like.

Processing. With respect to the base substrate forming the article of the present invention, the polycarbonate, polyester ingredients and optional components are pre-compounded, pelletized for further processing downstream into the base substrate. Pre-compounding can be carried out in conventional equipment, e.g., extruders and the like. The blends may be shaped into a final article by various techniques known in the art such as injection molding, extrusion, gas assist blow molding, or vacuum forming.

In one embodiment, the polyester polycarbonate resin blend is extruded into a sheet. The single or multi-piece sheet is then thermoformed (e.g., via vacuum forming) into a three dimensionally shaped "perform." The perform can be coated directly with the outer layer, or in another embodiment, under going further processing steps before being coated with a clear coat outer layer via roll coating, reverse roll coating, painting, spraying, or laminating.

In one embodiment, the polyester polycarbonate resin blend is extruded into a sheet, the clear coat in the form of a layer is placed on the polyester polycarbonate carrier sheet, and the multi-layer sheet is vacuum formed into a perform. The pre-form is then inserted into an injection molding apparatus and a polymer material is shot thereinto behind forming a finished article.

EXAMPLES

These examples are provided to illustrate the invention but are not intended to limit the scope of the invention.

The following materials were used in the examples of the present invention:

PCCD of varying viscosity (in centipoises or cp) and commercially available from Eastman Chemical Company of Tennessee.

Lexan PC105 available from General Electric Company of Pittsfield, Mass.

Clear coat: an acrylic urethane clear coat from Woerwag AG located in Stuttgart-Zuffenhausen, Germany.

The PCCD/PC components were mixed in a ribbon blender and extruded on a Werner-Pleiderer twin screw extruder at 300° C. to form pellets. The pellets were then fed into an injection moulding machine to mould into cut samples (5 cm by 5 cm plaque.

The plaque samples are first coated with the two-layer urethane clear coat from Woerwag AG having a total coating thickness of about 30–35 μm, and with the coating layer adjacent to the polyester polycarbonate substrate base having a thickness of 5–10 μm. The coated samples are submitted to (artificial) weathering. After aging, they are tested for optical properties, colorability, weathering, and adhesion strength.

Melt volume rate (MVR) of the polycarbonate granulate is measured according ISO 1133 (300° C./1.2 kg) in units of $cm^3/10$ min.

Melt Flow Rate (MFR) is based on the ASTM D1238 method. The equipment used is an extrusion plastometer equipped with an automatic timer. A typical example of this equipment would be the Tinius Olson MP 987. Before testing, the samples are dried for one hour at 150° C. The testing conditions are a melt temperature of 266° C., a total load of 5,000 gram, an orifice diameter of 0.0825 inch, and a dwell time of 5 minutes. The test result is expressed in the unit Poise.

Artificial weathering performance is measured using a Xenon Weatherometer apparatus according to ISO 4892 part 2. A duration of 3000 hrs was chosen, representative of 2 to 3 years outdoor exposure in Florida.

Optical properties (transmission and haze) are measured using a Gardner XL-835 Colorimeter according to ASTM D 1003 after 0 and 3000 hrs. Xenon exposure.

Weatherability is measured using a Color View Spectrocolorimeter (made by BYK-Chemie Co.) with the results being shown as ΔE. The smaller the value of ΔE is, the better is weatherability.

Colorability is also measured using the Colorimeter, with the results being shown as L, a and b as absolute measurements with "a" and "b" referring to the color tones. A color-free system would have a 0 for a and b, and a L value (lightness) of 100.

Adhesion test is conducted as follows. The plaques are scratched through the clear coat, i.e., with a needle, in a so-called crosshatch way with lines of 5 mm apart in both directions for a total of 50 squares of 5 mm×5 mm each square. The samples are subjected to cleaning for 15 minutes with steamjet, using a Kärcher K1400 with the samples being treated in a similar manner with steam jet nozzle being hand held at a distance of abut six inches away from the plaque samples. Adhesion strength is measured by the number of "squares" of clear coating being peeled off or delaminated. A value of 0 represents excellent adhesion—no delamination. A value of 5 (out of 50 squares) represent a delamination rate of less than 10% of the surface area.

The overall results of the experiments are presented in Table 1 and Table 2 illustrates embodiments in which data is outlined within boxes. In the embodiment as illustrated in Table 2, a clear coated article for use in exterior applications comprises a) a base substrate comprising a uniform miscible resin blend of a polycarbonate resin and a cycloaliphatic polyester resin containing at least about 80% by weight of units derived from a cycloaliphatic dicarboxylic acid, or chemical equivalent, and a cycloaliphatic diol or chemical equivalent; b) one or more layers of clear coat which constitute the outer layer on said base substrate. When the polyester content in the polyester polycarbonate blend is 70% or higher, the cycloaliphatic polyester resin has a viscosity of about 1500 to about 2500 poise for reducing the delamination of the clear coat. When the polyester content in the polyester polycarbonate blend is from about 20 to about 40, preferably about 30%, the polycarbonate resin preferably has an MFR of 7 or greater for reducing the delamination of the clear coat.

TABLE 1

| Example | % PCCD/PC | Visc. PCCD | PC MFR | 0 hours Xenon L | a | b | transmission (%) | haze (%) | 3000 hrs Xenon L | a | b | dE | Steam jet results |
|---|---|---|---|---|---|---|---|---|---|---|---|---|---|
| 1 | 100-0 | 2000 | — | 77.07 | -0.33 | 4.83 | 57.2 | 56.7 | 78.91 | 2.24 | 13.76 | 4.39 | 0 |
| 2 | 70-30 | 2000 | 25 | 88.32 | 0.40 | 5.85 | 85.0 | 13.5 | 95.36 | -0.07 | 3.89 | 3.75 | 0 |
| 3 | 50-50 | 2000 | 25 | 87.62 | 0.46 | 5.59 | 82.3 | 12.3 | 94.46 | -0.19 | 4.46 | 13.72 | 18 |
| 4 | 30-70 | 2000 | 25 | 89.13 | 0.37 | 4.70 | 80.9 | 15.5 | 93.95 | -1.27 | 9.04 | 6.91 | 0 |
| 5 | 30-70 | 2000 | 25 | 89.13 | 0.37 | 4.70 | 83.5 | 12.8 | 89.8 | 0.18 | 8.67 | 5.93 | 0 |
| 6 | 0-100 | 2000 | 25 | 85.01 | 0.74 | 7.14 | 74.4 | 25.7 | 96.47 | -0.27 | 3.64 | 8.95 | 30 |
| 7 | 100-0 | 2000 | — | 80.74 | -0.47 | 2.29 | 58.5 | 57.4 | 79.32 | 2.37 | 12.51 | 5.86 | 0 |
| 8 | 70-30 | 2000 | 3 | 92.88 | -0.06 | 5.34 | 88.5 | 10.8 | 96.76 | -0.27 | 3.58 | 4.21 | 0.5 |
| 9 | 50-50 | 2000 | 3 | 93.01 | 0.00 | 5.35 | 87.7 | 10.4 | 96.32 | -0.4 | 4.26 | 5.61 | 9 |
| 10 | 30-70 | 2000 | 3 | 92.78 | -0.09 | 5.88 | 86.7 | 9.06 | 95.97 | -0.46 | 5.19 | 6.60 | 8 |
| 11 | 0-100 | 2000 | 3 | 90.99 | 0.06 | 9.82 | 81.7 | 15.3 | 93.39 | -0.41 | 9.02 | 9.02 | 30 |
| 12 | 100-0 | 6000 | — | 74.69 | 0.00 | 7.25 | 53.6 | 64.3 | 77.58 | 1.9 | 12.39 | 3.86 | 30 |
| 13 | 70-30 | 6000 | 25 | 88.24 | 0.41 | 5.40 | 85.6 | 14.1 | 95.76 | -0.17 | 3.67 | 4.16 | 25 |
| 14 | 50-50 | 6000 | 25 | 90.04 | 0.28 | 5.28 | 86.0 | 11.3 | 95.11 | -0.24 | 3.39 | 5.19 | 16 |
| 15 | 30-70 | 6000 | 25 | 91.19 | 0.24 | 4.31 | 71.6 | 27.1 | 88.44 | 0.34 | 8.74 | 7.67 | 0.5 |
| 16 | 30-70 | 6000 | 25 | 80.29 | 0.76 | 7.59 | 81.4 | 15.4 | 92.88 | -0.2 | 5.76 | 7.45 | 0 |
| 17 | 70-30 | 6000 | 3 | 91.14 | -0.02 | 7.54 | 86.9 | 14.3 | 96.11 | -0.31 | 4.43 | 4.19 | 2 |
| 18 | 50-50 | 6000 | 3 | 91.46 | -0.08 | 6.65 | 85.7 | 15.2 | 95.49 | -0.4 | 5.31 | 5.03 | 6 |
| 19 | 50-50 | 6000 | 3 | 91.33 | 0.00 | 7.44 | 86.7 | 10.8 | 95.82 | -0.45 | 5.11 | 4.66 | 7 |
| 20 | 30-70 | 6000 | 3 | 92.69 | -0.31 | 7.21 | 86.0 | 10 | 95.53 | -0.61 | 7.01 | 8.51 | 5 |
| 21 | 70-30 | 4000 | 7 | 91.40 | 0.05 | 5.62 | 87.5 | 12.2 | 96.47 | -0.27 | 3.64 | 3.91 | 8 |

TABLE 1-continued

| | | | | | 0 hours | | | | 3000 hrs Xenon | | | | |
|---|---|---|---|---|---|---|---|---|---|---|---|---|---|
| Example | % PCCD/PC | Visc. PCCD | PC MFR | L | a | b | transmission (%) | haze (%) | L | a | b | dE | Steam jet results |
| 22 | 70-30 | 4000 | 7 | 92.45 | 0.07 | 5.65 | 87.3 | 12 | 96.29 | −0.26 | 3.67 | 3.77 | 5 |
| 23 | 50-50 | 4000 | 7 | 91.25 | 0.08 | 5.69 | 87.2 | 10.9 | 96.21 | −0.33 | 4.08 | 4.80 | 30 |
| 24 | 30-70 | 4000 | 7 | 92.26 | 0.00 | 6.37 | 85.3 | 11.9 | 95.21 | −0.39 | 6.38 | 8.24 | 0.5 |

TABLE 2

| | PCCD/PC | Visc. PCCD | PC MFR | L | a | b | transmission (%) | haze (%) | L | a | b | dE | Stream jet results |
|---|---|---|---|---|---|---|---|---|---|---|---|---|---|
| 1 | 0-100 | 2000 | 25 | 85.01 | 0.74 | 7.14 | 74.4 | 25.7 | 96.47 | −0.27 | 3.64 | 8.95 | 30 |
| 2 | 0-100 | 2000 | 3 | 90.99 | 0.06 | 9.82 | 81.7 | 15.3 | 93.39 | −0.41 | 9.02 | 9.02 | 30 |
| 3 | 30-70 | 4000 | 7 | 92.26 | 0 | 6.37 | 85.3 | 11.9 | 95.21 | −0.39 | 6.38 | 8.24 | 0.5 |
| 4 | 30-70 | 2000 | 25 | 89.13 | 0.37 | 4.7 | 80.9 | 15.5 | 93.95 | −1.27 | 9.04 | 6.91 | 0 |
| 5 | 30-70 | 2000 | 25 | 89.13 | 0.37 | 4.7 | 83.5 | 12.8 | 89.8 | 0.18 | 8.67 | 5.93 | 0 |
| 6 | 30-70 | 2000 | 3 | 92.78 | −0.09 | 5.88 | 86.7 | 9.06 | 95.97 | −0.46 | 5.19 | 6.6 | 8 |
| 7 | 30-70 | 6000 | 25 | 91.19 | 0.24 | 4.31 | 71.6 | 27.1 | 88.44 | 0.34 | 8.74 | 7.67 | 0.5 |
| 8 | 30-70 | 6000 | 25 | 80.29 | 0.76 | 7.59 | 81.4 | 15.4 | 92.88 | −0.2 | 5.76 | 7.45 | 0 |
| 9 | 30-0 | 6000 | 3 | 92.69 | −0.31 | 7.21 | 86 | 10 | 95.53 | −0.61 | 7.01 | 8.51 | 5 |
| 10 | | | | | | | | | | | | | |
| 11 | 50-50 | 2000 | 25 | 87.62 | 0.46 | 5.59 | 82.3 | 12.3 | 94.46 | −0.19 | 4.46 | 13.72 | 18 |
| 12 | 50-50 | 2000 | 3 | 93.01 | 0 | 5.35 | 87.7 | 10.4 | 96.32 | −0.4 | 4.26 | 5.61 | 9 |
| 13 | 50-50 | 6000 | 25 | 90.04 | 0.28 | 5.28 | 86 | 11.3 | 95.11 | −0.24 | 3.39 | 5.19 | 16 |
| 14 | 50-50 | 6000 | 3 | 91.46 | −0.08 | 6.65 | 85.7 | 15.2 | 95.49 | −0.4 | 5.31 | 5.03 | 6 |
| 15 | 50-50 | 6000 | 3 | 91.33 | 0 | 7.44 | 86.7 | 10.8 | 95.82 | −0.45 | 5.11 | 4.66 | 7 |
| 16 | 50-50 | 4000 | 7 | 91.25 | 0.08 | 5.69 | 87.2 | 10.9 | 96.21 | −0.33 | 4.08 | 4.8 | 30 |
| 17 | | | | | | | | | | | | | |
| 18 | 70-30 | 2000 | 25 | 88.32 | 0.4 | 5.85 | 85 | 13.5 | 95.36 | −0.07 | 3.89 | 3.75 | 0 |
| 19 | 70-30 | 2000 | 3 | 92.88 | −0.06 | 5.34 | 88.5 | 10.8 | 96.76 | −0.27 | 3.58 | 4.21 | 0.5 |
| 20 | 70-30 | 6000 | 25 | 88.24 | 0.41 | 5.4 | 85.6 | 14.1 | 95.76 | −0.17 | 3.67 | 4.16 | 25 |
| 21 | 70-30 | 6000 | 3 | 91.14 | −0.02 | 7.54 | 86.9 | 14.3 | 96.11 | −0.31 | 4.43 | 4.19 | 2 |
| 22 | 70-30 | 4000 | 7 | 91.4 | 0.05 | 5.62 | 87.5 | 12.2 | 96.47 | −0.27 | 3.64 | 3.91 | 8 |
| 23 | 70-30 | 4000 | 7 | 92.45 | 0.07 | 5.65 | 87.3 | 12 | 96.29 | −0.26 | 3.67 | 3.77 | 5 |
| 24 | 100-0 | 2000- | | 77.07 | −0.33 | 4.83 | 57.2 | 56.7 | 78.91 | 2.24 | 13.76 | 4.39 | 0 |
| 25 | 100-0 | 2000- | | 80.74 | −0.47 | 2.29 | 58.5 | 57.4 | 79.32 | 2.37 | 12.51 | 5.86 | 0 |
| 26 | 100-0 | 6000- | | 74.69 | 0 | 7.25 | 53.6 | 64.3 | 77.58 | 1.9 | 12.39 | 3.86 | 30 |

What is claimed is:

1. An article for use in exterior applications comprising:
a) a base substrate comprising a uniform miscible resin blend of a polycarbonate resin and a cycloaliphatic polyester resin, said cycloaliphatic polyester resin comprising the reaction product of an aliphatic $C_2$–$C_{20}$ diol or chemical equivalent and a $C_6$–$C_{20}$ aliphatic diacid or chemical equivalent, said cycloaliphatic polyester resin contains at least about 80% by weight of a cycloaliphatic dicarboxylic acid, or chemical equivalent, and/or of a cycloaliphatic diol or chemical equivalent;
b) an outer layer on said base substrate, said outer layer comprising an acrylic resin, a blend of a thermoplastic fluorinated polymer and an acrylic resin, an inclusive ionomer, a polycarbonate, a polyvinyl chloride, or a thermoplastic polyurethane, wherein the viscosity of the base layer is selected to improve the adhesion between the base substrate and the outer layer.

2. The clear coated article according to claim 1, wherein said base substrate comprises a blend of a polycarbonate resin and cycloaliphatic polyester resin, said base substrate having a polyester content in the polyester polycarbonate blend of 70% or higher wherein said cycloaliphatic polyester resin has a viscosity of about 1500 to about 2500 poise for reducing the delamination of the clear coat or said base substrate having a polyester content in the polyester polycarbonate blend of about 20% to about 40 by weight wherein said polycarbonate resin has an MFR of 7 or greater for reducing the delamination of the clear coat.

3. The clear coated article according to claim 1, wherein said base substrate comprises a blend of a polycarbonate resin and cycloaliphatic polyester resin having a ratio of polycarbonate resin to cycloaliphatic polyester resin such that said base substrate has a transmission rate of at least 75%.

4. The article according to claim 1, wherein said outer layer is a clear coat layer having a transmission rate of at least about 80%.

5. The article according to claim 1, wherein said base substrate comprises a blend of a polycarbonate resin and cycloaliphatic polyester resin having a ratio of polycarbonate resin to cycloaliphatic polyester resin such that said blend has a glass transition temperature of from about 60 to 150° C.

6. The article according to claim 1, wherein the base substrate further comprises an effective amount of a stabilizer to prevent color formation of said base substrate.

7. The article according to claim 6, wherein said stabilizer is chosen from the group consisting of: phosphorus oxo acids, acid organo phosphates, acid organo phosphites, acid phosphate metal salts, acidic phosphite metal salts or mixture thereof giving an article with greater than or equal to about 80% transmittance.

8. The article according to claim 1, wherein the cycloaliphatic polyester is comprised of cycloaliphatic diacid and cycloaliphatic diol units.

9. The article according to claim 1, wherein the polyester is polycyclohexane dimethanol cyclohexane dicarboxylate (PCCD).

10. The article according to claim 1, wherein the polycarbonate is BPA-PC and the cycloaliphatic polyester is PCCD.

11. An article for use in exterior applications comprising:
a) a base substrate comprising a uniform miscible resin blend having a viscosity and comprising a polycarbonate resin and a cycloaliphatic polyester resin, said cycloaliphatic polyester resin comprising the reaction product of an aliphatic C2–C20 diol or chemical equivalent and a C6–C20 aliphatic diacid or chemical equivalent, said cycloaliphatic polyester resin contains at least about 80% by weight of a cycloaliphatic dicarboxylic acid, or chemical equivalent, and/or of a cycloaliphatic diol or chemical equivalent;
b) an outer clear coat layer on said base substrate; said outer clear coat layer comprising an acrylic resin, a blend of a thermoplastic fluorinated polymer and an acrylic resin, an inclusive ionomer, a polycarbonate, a polyvinyl chloride or a thermoplastic polyurethane, said viscosity of said base layer being selected for enhancing the adherence of said clear coat;
c) said base substrate having a polyester content in the polyester polycarbonate blend of 70% or higher wherein said cycloaliphatic polyester resin has a viscosity of about 1500 to about 2500 poise for reducing the delamination of the clear coat or said base substrate having a polyester content in the polyester polycarbonate blend of about 20% to about 40 by weight wherein said polycarbonate resin has an MFR of 7 or greater for reducing the delamination of the clear coat.

12. The article according to claim 11, wherein said article to have a reduced delamination rate when of said outer layer when said article is spray with a steam jet.

13. The article according to claim 11, wherein said outer layer is a clear coat layer having a transmission rate of at least about 75%.

14. The article according to claim 11, wherein said base substrate comprises a blend of a polycarbonate resin and cycloaliphatic polyester resin having a ratio of polycarbonate resin to cycloaliphatic polyester resin such that said blend has a glass transition temperature of from about 60 to 150° C.

15. The article according to claim 11, wherein the base substrate further comprises an effective amount of a stabilizer to prevent color formation of said base substrate.

16. The article according to claim 11, wherein said stabilizer is chosen from the group consisting of: phosphorus oxo acids, acid organo phosphates, acid organo phosphites, acid phosphate metal salts, acidic phosphite metal salts or mixture thereof giving an article with greater than or equal to about 80% transmittance.

17. The article according to claim 11, wherein the cycloaliphatic polyester is comprised of cycloaliphatic diacid and cycloaliphatic diol units.

18. The article according to claim 11, wherein the polyester is polycyclohexane dimethanol cyclohexane dicarboxylate (PCCD).

19. The article according to claim 11, wherein the polycarbonate is BPA-PC and the cycloaliphatic polyester is PCCD.

20. The article according to according to claim 1, wherein said article is formed by injection molding, extrusion, blow molding, laminating, co-extrusion, or vacuum forming.

* * * * *